US009925858B2

(12) United States Patent
Itagaki et al.

(10) Patent No.: US 9,925,858 B2
(45) Date of Patent: Mar. 27, 2018

(54) HYBRID DRIVE DEVICE

(71) Applicant: TOYOTA JIDOSHA KABUSHIKI KAISHA, Toyota-shi, Aichi-ken (JP)

(72) Inventors: Kenji Itagaki, Shizuoka-ken (JP); Naofumi Magarida, Shizuoka-ken (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 102 days.

(21) Appl. No.: 15/172,485

(22) Filed: Jun. 3, 2016

(65) Prior Publication Data

US 2017/0001510 A1    Jan. 5, 2017

(30) Foreign Application Priority Data

Jul. 1, 2015    (JP) ................. 2015-132769

(51) Int. Cl.
| | |
|---|---|
| *B60K 6/383* | (2007.10) |
| *B60K 6/365* | (2007.10) |
| *B60K 6/442* | (2007.10) |
| *B60K 6/445* | (2007.10) |
| *F16D 41/02* | (2006.01) |

(Continued)

(52) U.S. Cl.
CPC ............ *B60K 6/383* (2013.01); *B60K 6/365* (2013.01); *B60K 6/442* (2013.01); *F16D 41/02* (2013.01); *F16D 41/125* (2013.01); *B60K 6/445* (2013.01); *B60Y 2200/92* (2013.01); *B60Y 2300/182* (2013.01); *B60Y 2300/424* (2013.01); *B60Y 2400/427* (2013.01); *F16D 41/16* (2013.01); *F16D 41/26* (2013.01); *F16D 48/06* (2013.01); *F16H 48/10* (2013.01); *F16H 48/20* (2013.01); *Y10S 903/91* (2013.01); *Y10S 903/913* (2013.01); *Y10S 903/946* (2013.01)

(58) Field of Classification Search
None
See application file for complete search history.

(56) References Cited

U.S. PATENT DOCUMENTS

| | | | | |
|---|---|---|---|---|
| 9,739,321 | B2* | 8/2017 | Itagaki | ............... F16D 41/125 |
| 9,809,217 | B2* | 11/2017 | Itagaki | ............... B60W 20/17 |

(Continued)

FOREIGN PATENT DOCUMENTS

| | | |
|---|---|---|
| CN | 104589993 A | 5/2015 |
| JP | 01-275922 A | 11/1989 |

(Continued)

*Primary Examiner* — Jacob S. Scott
(74) *Attorney, Agent, or Firm* — Andrews Kurth Kenyon LLP

(57) ABSTRACT

The hybrid drive device of the present invention includes a selectable one-way clutch 12 that includes a rotational plate that is capable of receiving the reaction torque of an internal combustion engine and that is provided to a power split mechanism, and that can be changed over between: a locked mode in which, in the state of receiving the reaction torque, positive rotation of the rotational plate is prevented while negative rotation of the rotational plate in the direction opposite to the positive rotation is permitted; and a free mode in which, in the state of receiving the reaction torque, the positive rotation and the negative rotation of the rotational plate are both permitted. And, when misfiring of the internal combustion engine occurs, the selectable one-way clutch is kept in the free mode.

4 Claims, 10 Drawing Sheets

(51) Int. Cl.
*F16D 41/12* (2006.01)
*F16D 41/16* (2006.01)
*F16D 41/26* (2006.01)
*F16D 48/06* (2006.01)
*F16H 48/10* (2012.01)
*F16H 48/20* (2012.01)

(56) References Cited

U.S. PATENT DOCUMENTS

| | | | |
|---|---|---|---|
| 2010/0018786 A1* | 1/2010 | Samie | B60K 17/02 |
| | | | 180/65.6 |
| 2011/0177900 A1 | 7/2011 | Simon | |
| 2015/0105205 A1 | 4/2015 | Kurosaki et al. | |

FOREIGN PATENT DOCUMENTS

| | | | | |
|---|---|---|---|---|
| JP | 2010-036880 A | 2/2010 | | |
| JP | 2010-052517 A | 3/2010 | | |
| JP | 2013-517175 A | 5/2013 | | |
| JP | 2015-077846 A | 4/2015 | | |
| JP | 2013-517175 A | 5/2016 | | |
| WO | 2011-088319 A1 | 7/2011 | | |
| WO | 2015-056087 A1 | 4/2015 | | |
| WO | WO-2015162480 A2 * | 10/2015 | ............. | F16D 48/06 |
| WO | WO-2015162484 A1 * | 10/2015 | ............. | B60K 6/383 |
| WO | WO-2015162487 A1 * | 10/2015 | ............. | B60K 6/383 |

* cited by examiner

HYBRID DRIVE DEVICE

INCORPORATION BY REFERENCE

The disclosure of Japanese Patent Application NO. 2015-132769 filed on Jul. 1, 2015, including the specification, drawings and abstract is incorporated herein by reference in its entirety.

BACKGROUND OF THE INVENTION

Field of the Invention

The present invention relates to a hybrid drive device to which an engine and a motor-generator are provided as sources of drive power.

Description of the Related Art

In a hybrid drive device, a system is per se known in which a dog clutch DC3 and a one-way clutch OC3 are provided between a rotor shaft of a first motor-generator MG1 and a case C of a hybrid transaxle, and in which one engagement member of the dog clutch DC3 is connected to the one-way clutch OC3 while the other engagement member of the dog clutch DC3 is fixed to the case C (see Japanese Patent Application Publication No. 2010-36880 (JP-A-2010-36880)). With this type of hybrid drive device, by controlling the dog clutch DC3 to be in its engaged state during high speed traveling, a state is established in which, due to the one-way clutch OC3, positive rotation of the first motor-generator MG1 is prevented while negative rotation of the first motor-generator MG1 is permitted. Since, due to this, a Hi gear locked mode which is a parallel mode to the high speed sift position (Hi) is implemented, accordingly it is possible to enhance the energy efficiency during high speed traveling.

And now, a selectable one-way clutch is per se known that is capable of selecting either a locked mode in which, during rotation, it permits torque transmission between two members only in a predetermined single rotational direction, or a free mode in which, during rotation, it separates torque transmission in both directions between those two members. Since such a selectable one-way clutch is endowed with this type of function, accordingly it is possible to replace the dog clutch DC3 and the one-way clutch OC3 of the above described hybrid drive device of JP-A-2010-36880 with this selectable one-way clutch, which is a unitary device. In detail, it is possible to make such a selectable one-way clutch function in a similar manner to the hybrid drive device of JP-A-2010-36880 by fixing one of its two members to the case C, which thus serves as a fixed member, while connecting the other of the two members to the rotor shaft of the first motor-generator MG1, which thus serves as a rotating member.

In a hybrid drive device in which the replacement described above has been performed, the rotating member of the selectable one-way clutch receives and bears the reaction torque of the engine torque outputted by the engine. In the state in which engine combustion is stable, the engine torque continues to be outputted in the positive direction. Due to this, during the locked mode in the state in which positive rotation of the rotating member is prevented, the state in which torque acts in the positive direction upon the rotating member continues. Accordingly, in the state in which combustion in the engine remains stable, in the locked mode, the engagement of the selectable one-way clutch is maintained.

However if, in the locked mode, an engine combustion anomaly occurs and leads to reduction of the engine torque, then the engine rotational speed decreases. Together with this decrease, the torque upon the rotating member whose positive rotation was prevented is removed, so that the engagement is temporarily released and negative rotation occurs. When thereafter the engine combustion returns to normal, the engine rotational speed rises. Due to this, there is a possibility that the components of the selectable one-way clutch may be damaged when its re-engagement occurs. Moreover, there is a possibility that wear or strange noises may be generated due to the occurrence of ratcheting, which is a phenomenon in which, in a situation in which the engine torque is great during the above return to normal, the rotating member rotates in the positive rotational direction, which is the direction in which it is not properly supposed to rotate.

Accordingly, an object of the present invention is to provide a hybrid drive device which, when an engine combustion anomaly occurs, is capable of avoiding deterioration of components of a selectable one-way clutch and the generation of wear or strange noises due to the occurrence of ratcheting.

SUMMARY OF THE INVENTION

The hybrid drive device of the present invention includes: an engine; a motor-generator; an output portion that outputs torque to a drive wheel; a differential mechanism having a plurality of rotating elements that are differentially rotatable with respect to one another, the engine being joined to one of the plurality of rotating elements, the motor-generator being joined to another one of the plurality of rotating elements, and the output portion being joined to yet another one of the plurality of rotating elements; a selectable one-way clutch comprising a rotating member that can receive a reaction torque of an engine torque of the engine and that is provided to the differential mechanism, and that can be changed over between: a locked mode in which, in the state of receiving the reaction torque, positive rotation of the rotating member is prevented, while negative rotation of the rotating member in the direction opposite to the positive rotation is permitted; and a free mode in which, in the state of receiving the reaction torque, the positive rotation and the negative rotation of the rotating member are both permitted; and a control device that changes over the selectable one-way clutch from the free mode to the locked mode when predetermined condition is satisfied; wherein the control device keeps the selectable one-way clutch in the free mode if a combustion anomaly that is accompanied by a reduction in the engine torque of the engine has occurred, or if a device anomaly that is associated with such a combustion anomaly has occurred.

According to this hybrid drive device, if a combustion anomaly that is accompanied by a reduction in the torque of the engine has occurred, or if a device anomaly that is associated with such a combustion anomaly has occurred, then the selectable one-way clutch is kept in the free mode, irrespective of whether or not a predetermined condition for changing over the selectable one-way clutch to the locked mode is satisfied. Due to this, if such a combustion anomaly as described above occurs during the locked mode, it is possible to avoid deterioration of components of the selectable one-way clutch that might occur due to re-engagement of the selectable one-way clutch, and it is also possible to avoid the generation of wear or strange noises due to the occurrence of ratcheting.

According to one aspect of the hybrid drive device of the present invention, when the selectable one-way clutch is in the locked mode, the control device may control the motor-generator to stop its functions as an electric motor and as a generator so that it is in a shut-down state in which it is capable of free-wheeling. Since, when the motor-generator is controlled to be in a shut-down state, the reaction torque of the engine torque cannot be supported by the motor torque of the motor-generator, accordingly, if an anomaly in the combustion of the engine occurs and the engine torque drops, the torque upon the rotating member can easily become cancelled. According to this aspect of the present invention, if a combustion anomaly of the engine or a device anomaly occurs, it is possible to avoid the adverse effect described above, because of the fact that the torque upon the rotating member of the selectable one-way clutch can easily be released.

The structure of the differential mechanism is not particularly limited only to including a plurality of rotating elements to each of which an engine, a motor-generator, and an output portion are joined. For example, according to still another aspect of the present invention, the differential mechanism may be provided with four rotating elements, with the motor-generator being joined to a first rotating element of the four rotating elements, the rotating member of the selectable one-way clutch being joined to a second rotating element of the four rotating elements, the engine being joined to a third rotating element of the four rotating elements, and the output portion being joined to a fourth rotating element of the four rotating elements; and, when these four rotating elements are laid out upon a velocity diagram, they may appear in the order: the first rotating element; the second rotating element; the third rotating element; and the fourth rotating element. Moreover, according to yet another aspect of the present invention, the differential mechanism may be provided with three rotating elements, with the motor-generator and the rotating member of the selectable one-way clutch being joined to a first rotating element of the three rotating elements, the engine being joined to a second rotating element of the three rotating elements, and the output portion being joined to a third rotating element of the three rotating elements; and, when these three rotating elements are laid out upon a velocity diagram, they may appear in the order: the first rotating element; the second rotating element; and the third rotating element. In either of the aspects of the present invention described above, the rotating element to which the engine is joined and the rotating element to which the rotating member of the selectable one-way clutch is joined are adjacent to one another upon the velocity diagram. Accordingly, when the engine is outputting torque and also the selectable one-way clutch is in the locked mode, the rotating member of the selectable one-way clutch comes to receive the reaction torque of the engine. And also the rotating element to which the output portion is joined and the rotating element to which the engine is joined are adjacent to one another upon the velocity diagram on the opposite side of the rotating element to which the rotating member of the selectable one-way clutch is joined. Because of this, it becomes possible for the transmission ratio of the output portion with respect to the engine rotational speed to be in a fixed state, due to the selectable one-way clutch being operated to its locked mode and positive rotation of the rotating member thereby being prohibited.

The anomaly in the engine combustion may be any type of anomaly, provided that it is one that accompanies decrease of the engine torque; and the present invention can also be applied to a case in which various types of anomaly may occur in combination. Furthermore, the device anomaly may be of any type, provided that it is a device anomaly that accompanies a combustion anomaly.

DETAILED DESCRIPTION OF THE EMBODIMENTS

Embodiment #1

Figure 1:
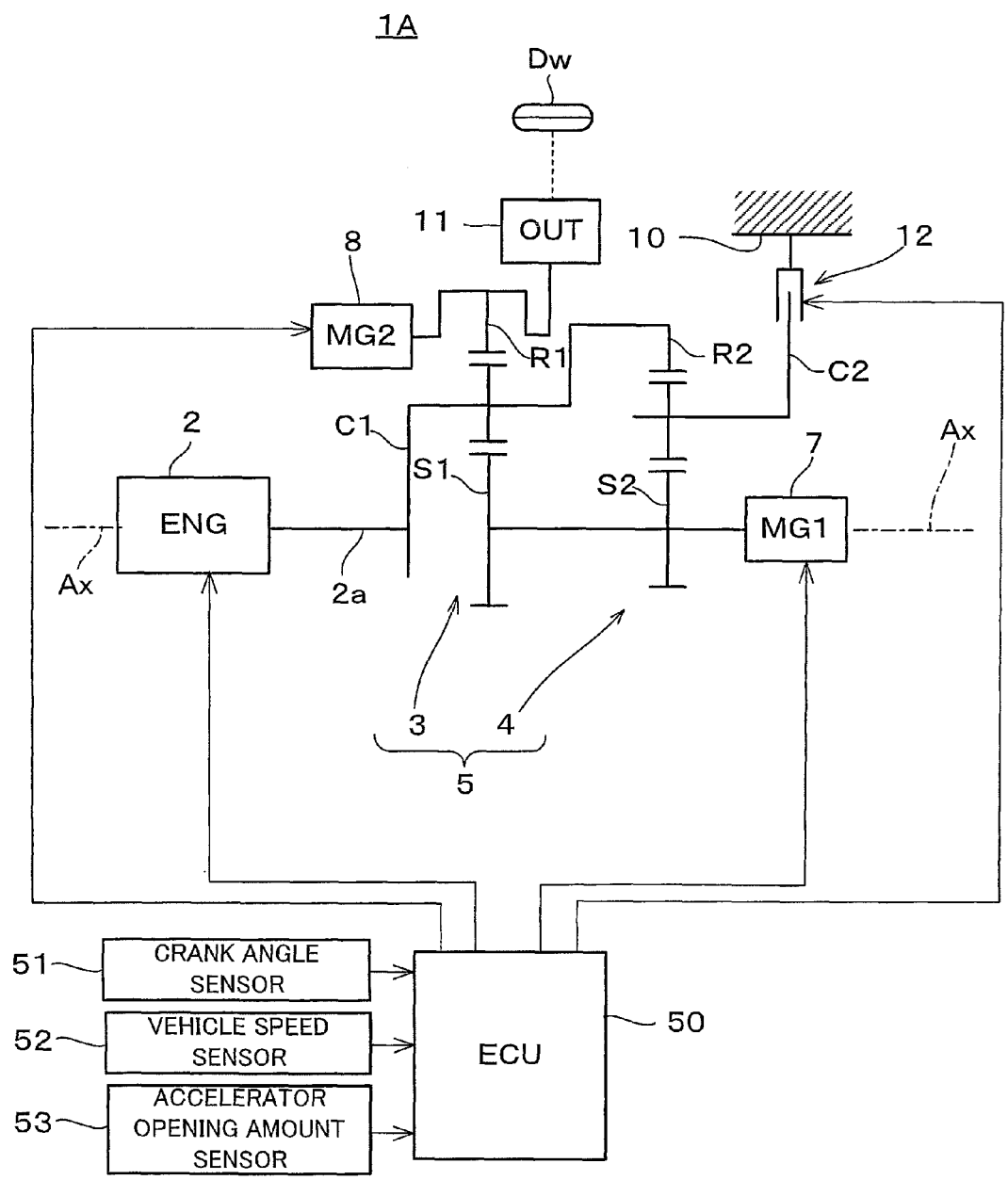
FIG. 1 is a schematic figure showing the structure of a hybrid vehicle to which a hybrid drive device according to a first embodiment of the present invention has been applied.

As shown in FIG. 1, a vehicle 1A is built as a hybrid vehicle to which a hybrid drive device according to a first embodiment of the present invention is applied. This vehicle 1A comprises a spark ignition type internal combustion engine 2 which serves as an engine, a power split mechanism 5 which serves as a differential mechanism, and two motor-generators 7 and 8. The power split mechanism 5, the motor-generators 7 and 8, and power transmission elements of various kinds are received within a casing 10.

The power split mechanism 5 is built as a combination of two planetary gear mechanisms 3 and 4 which are of the single pinion type. A sun gear S1 of the first planetary gear mechanism 3 and a sun gear S2 of the second planetary gear mechanism 4 are joined together so as to rotate as a unit, and a carrier C1 of the first planetary gear mechanism 3 and a ring gear R2 of the second planetary gear mechanism 4 are joined together so as to rotate as a unit. Due to this, four rotating elements that rotate differentially with respect to one another are defined within the power split mechanism 5. A crank shaft 2a of the internal combustion engine 2 is joined to the carrier C1. The first motor-generator 7 is joined to the sun gear S2, and the second motor-generator 8 is joined to the ring gear R1. In order to output torque to the drive wheels Dw, an output portion 11 that includes a gear train and so on not shown in the figures is joined to the ring gear R1. In this first embodiment, the sun gear S2 (and the sun gear S1) correspond to the "first rotating element" of the Claims, the carrier C2 corresponds to the "second rotating element" of the Claims, the carrier C1 (and the ring gear R2) correspond to the "third rotating element" of the Claims, and the ring gear R1 corresponds to the "fourth rotating element" of the Claims. As will be clear from the velocity diagram of FIG. 7, when these four rotating elements are laid out upon this velocity diagram, they appear in the order: the sun gear S2 (and the sun gear S1) which correspond to the first rotating element; the carrier C2 which corresponds to the second rotating element; the carrier C1 (and the ring gear R2) which correspond to the third rotating element; and the ring gear R1 which corresponds to the fourth rotating element.

Figure 2:
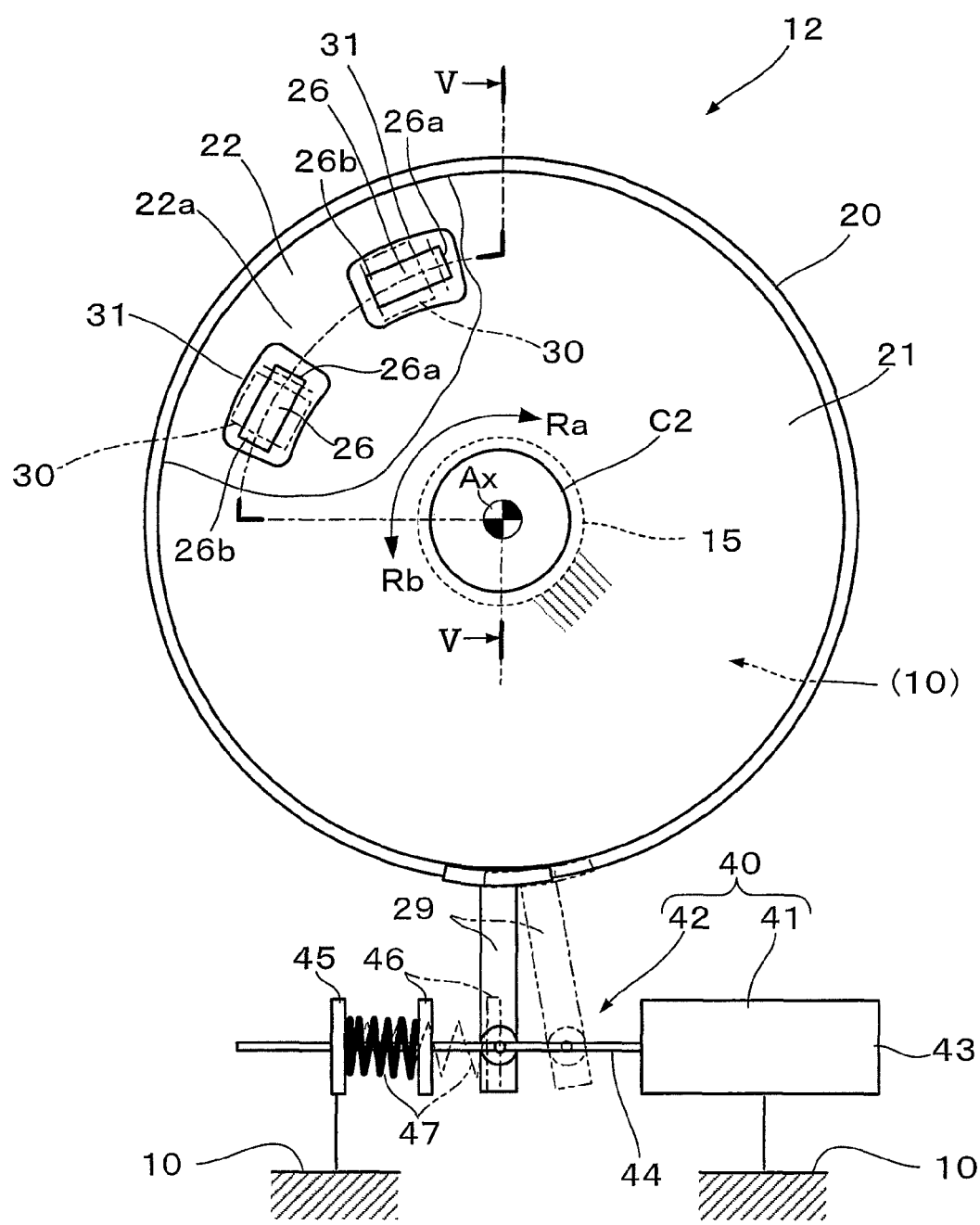
FIG. 2 is a figure showing a selectable one-way clutch that is provided to the hybrid vehicle of FIG. 1.

A selectable one-way clutch (hereinafter simply termed a "clutch") 12 is provided to the vehicle 1A. This clutch 12 is interposed between the carrier C2 of the power split mechanism 5 and the casing 10, and functions as a brake. As shown in FIG. 2, the operational mode of the clutch 12 can be selected between: a locked mode in which, when the rotational direction of the carrier C2 is the positive rotational direction Ra, the clutch 12 permits transmission of torque from the carrier C2 to the casing 10 so that the carrier C2 is in the fixed state, and, when the rotational direction is the negative rotational direction Rb, the clutch 12 separates this torque transmission so that the carrier C2 is in the released state; and a free mode in which, whichever be the direction of rotation of the carrier C2, either the positive rotational direction Ra or the negative rotational direction Rb, the clutch 12 separates torque transmission from the carrier C2 to the casing 10, so that the carrier C2 is kept in the released state.

Figure 3:
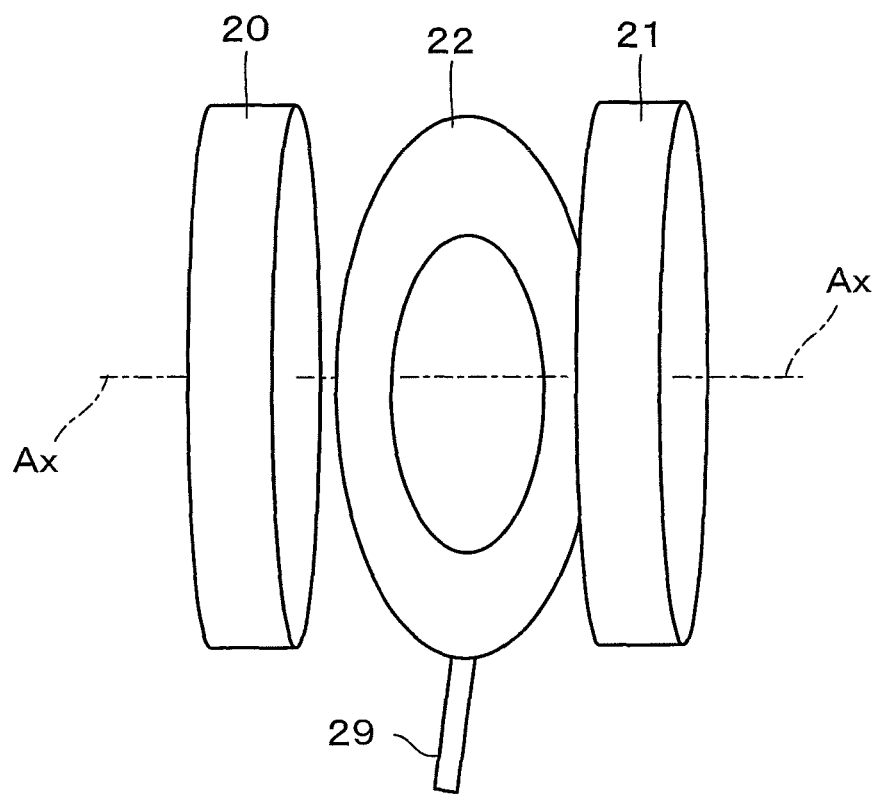
FIG. 3 is a schematic figure showing structural elements of this selectable one-way clutch.

As shown in FIG. 2 and FIG. 3, the clutch 12 comprises a hold plate 20 that is provided upon a fixed shaft 15 fixed to the casing 10 and that is in a state in which it is not capable of rotating around an axis Ax, a rotational plate 21 that serves as a rotating member and that is provided to the carrier C2 in a state in which it rotates integrally with the carrier C2 around the axis Ax, and a selector plate 22 that is disposed between the hold plate 20 and the rotational plate 21 and that is rotatable around the axis Ax.

Figure 4:
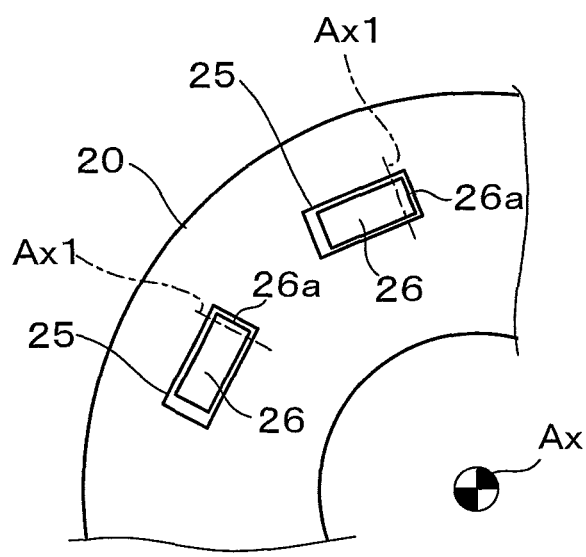
FIG. 4 is a figure showing a portion of a hold plate.
Figure 5:
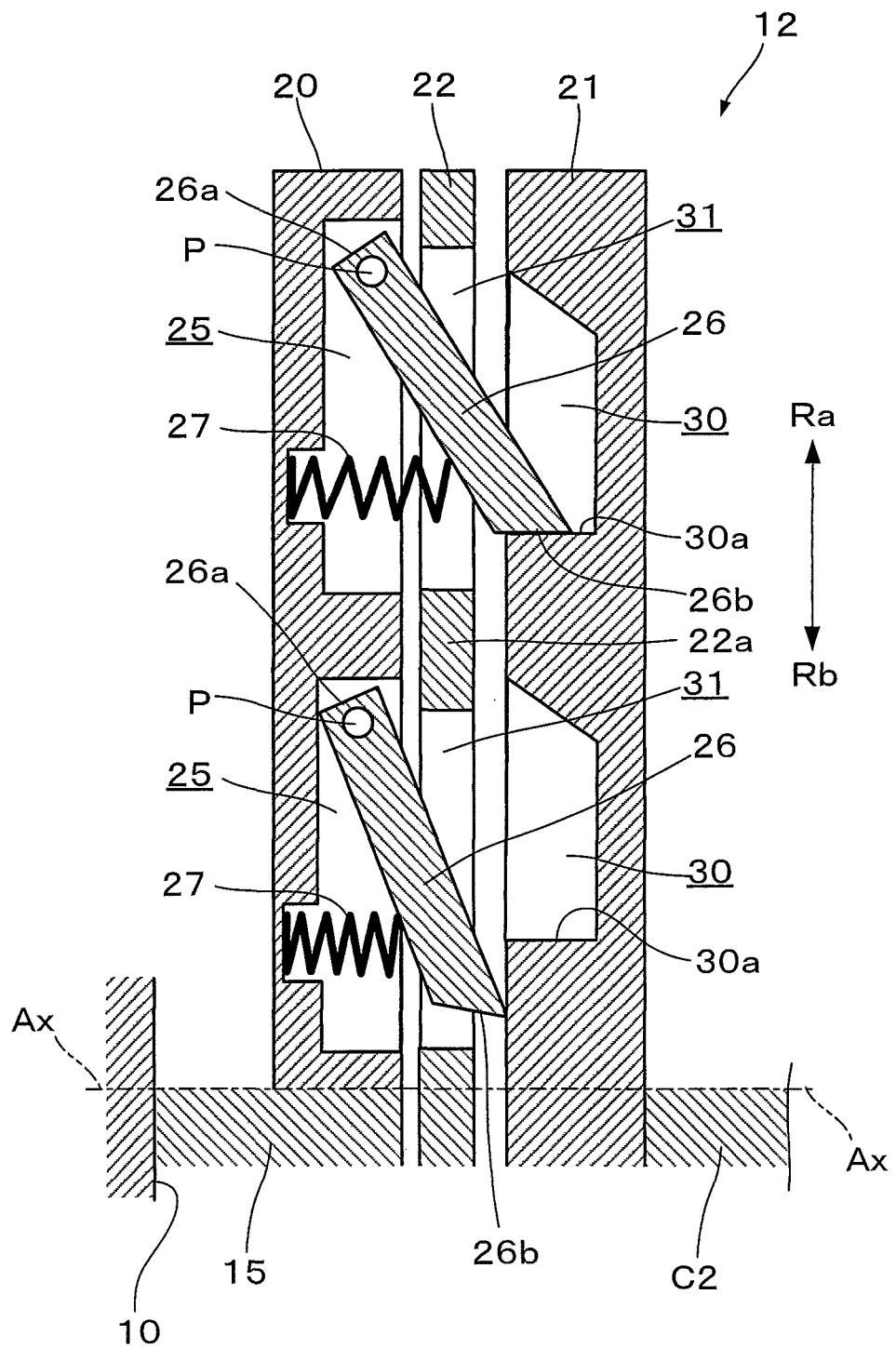
FIG. 5 is a sectional view along lines V-V of the FIG. 2 structure, shown when the one-way clutch is in the locked mode.

As shown in FIGS. 2, 4, and 5, a plurality of holding pockets 25 are formed in the hold plate 20, and these open to the side of the hold plate 20 that opposes the rotational plate 21 and are arranged along its circumferential direction. One pawl member 26 that can engage into the rotational plate 21 is provided to each of these holding pockets 25. A base end section 26a of each of the pawl members 26 is attached to the hold plate 20 via a support shaft P that extends in the radial direction of the hold plate 20 so that the pawl member 26 is rotatable around an axis Ax1, and moreover each of the pawl members 26 is biased by a spring 27 in the direction to project toward the rotational plate 21. Due to this, each of the pawl members 26 can be operated between a state in which it is retracted towards the hold plate 20 and is received in the holding pocket 25 so that its projection therefrom is limited, and a state in which it projects from the hold plate 20 toward the rotational plate 21. In other words, each of the pawl members 26 is provided to the hold plate 20 in such a manner that it is capable of projecting therefrom.

As shown in FIGS. 2 and 5, a plurality of recesses 30 are formed in the rotational plate 21, and these open to the side of the rotational plate 21 that opposes the hold plate 20 and are arranged along its circumferential direction. Each of these recesses 30 has a wall portion 30a against which the tip end section 26b of a pawl member 26 may contact when the pawl member 26 is projected and engages with the rotational plate 21. While these features are not shown in the figures, the number of recesses 30 is greater than the number of pawl members 26, and moreover the phases of the recesses 30 and the phases of the pawl members 26 are different from one another (refer to FIG. 5). Accordingly, some (but not all) of the plurality of pawl members 26, when they are projected, can be engaged into some (but not all) of the plurality of recesses 30.

The selector plate 22 is formed with a plurality of apertures 31 that are arranged around its circumferential direction and through which portions of the pawl members 26 can pass when they are projected, and that are in phase with the pawl members 26. The rotational position of the selector plate 22 can be changed over between a lock position shown in FIG. 5 in which the pawl members 26 pass through the apertures 31 in the selector plate 22 and are capable of engaging with one or more of the recesses 30 of the rotational plate 21, and a release position shown in FIG. 6 in which projection of all of the pawl members 26 is limited due to the tip end sections 26b of the pawl members 26 coming into contact against non-formation portion 22a of the selector plate 22 in which the apertures 31 are not formed. Due to this, either the locked mode described above or the free mode of the clutch 12 can be selectively established.

As shown in FIG. 2, an operation arm 29 that extends in the radial direction is provided to the selector plate 22, and the rotational position of the selector plate 22 is changed over by this operation arm 29 being driven by a drive device 40. The drive device 40 comprises an actuator 41 and a transmission mechanism 42 that transmits the operation of the actuator 41 to the operation arm 29 of the selector plate 22. The actuator 41 includes a main body 43 that is fixed to the casing 10 and a drive rod 44 that can move forward and backward with respect to the main body 43 and that moreover is link-connected to the operation arm 29. And the transmission mechanism 42 includes a guide member 45 that is fixed to the casing 10 and that guides the drive rod 44 of the actuator 41, a spring seat 46 that is fixed to the drive rod 44, and a return spring 47 that is installed between the guide member 45 and the spring seat 46 so as to be capable of being compressed therebetween.

The state shown by solid lines in FIG. 2 is a state in which, due to operation of the actuator 41 of the drive device 40, the drive rod 44 has been projected from the main body 43 against the elastic force of the return spring 47, and the selector plate 22 has been changed over to its lock position. In this state, the clutch 12 is in the locked mode described above. On the other hand when, from the state shown in FIG. 2 by the solid lines, the actuator 41 of the drive device 40 is changed over to not operating, the drive rod 44 is retracted toward the main body 43 by the elastic force of the return spring 47, and the operation arm 29 shifts to its position shown by the double dotted broken lines, so that the selector plate 22 is changed over to its release position. Due to this, the clutch 12 is put into the free mode.

During the locked mode shown in FIG. 5, when the direction of rotation of the rotational plate 21 is the positive rotational direction Ra, the tip end section 26b of at least one of the pawl members 26 comes into contact against the wall portion 30a of one of the recesses 30. Accordingly, this pawl member 26 engages with that recess 30 of the rotational plate 21, and the hold plate 20 and the rotational plate 21 are coupled together, so that torque transmission between them becomes possible and the carrier C2 is fixed with respect to the casing 10. On the other hand, when the direction of rotation of the rotational plate 21 is the negative rotational direction Rb, since the pawl member 26 becomes tilted toward the negative rotational direction Rb, accordingly, even though the pawl member 26 does somewhat interfere with the recess 30 of the rotational plate 21, the pawl member 26 just gets pressed back by the rotational plate 21 toward the hold plate 20. Due to this, the pawl member 26 does not engage with the recess 30. Accordingly, if the clutch 12 is in the locked mode, when the direction of rotation of the rotational plate 21 is the negative rotational direction Rb, torque transmission between the hold plate 20 and the rotational plate 21 is separated, and the rotational plate 21 is released.

Figure 6:
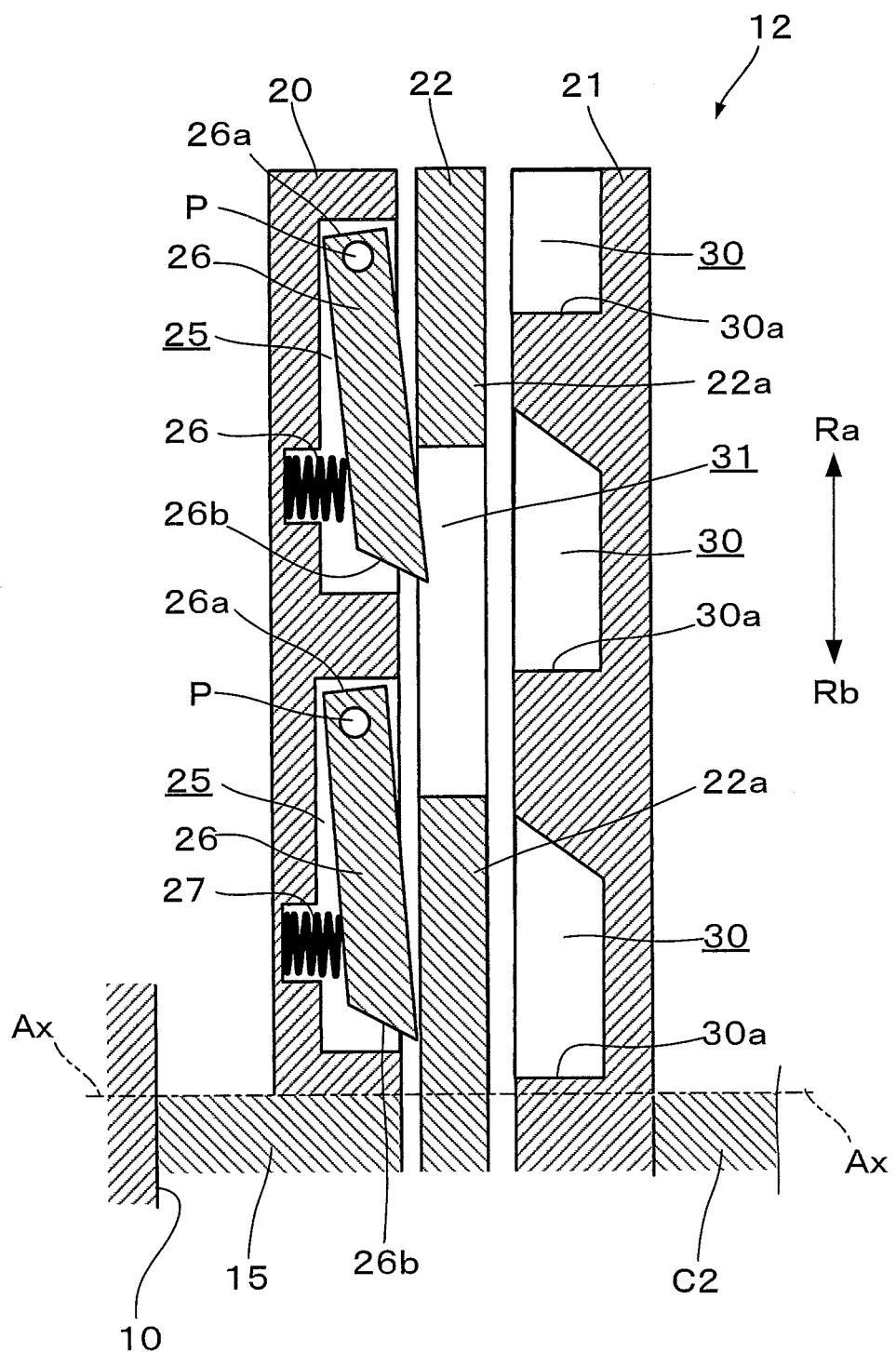
FIG. 6 is a sectional view along lines V-V of the FIG. 2 structure, shown when the one-way clutch is in the free mode.

On the other hand, during the free mode shown in FIG. 6, the projection of all of the pawl members 26 is limited by the selector plate 22, and the pawl members 26 are kept in the state of being held back toward the hold plate 20, so that they do not reach the recesses 30 of the rotational plate 21. Accordingly torque transmission from the rotational plate 21 to the hold plate 20 is separated, whichever the direction of rotation of the rotational plate 21 may be, either the positive rotational direction Ra or the negative rotational direction Rb, so that the rotational plate 21 is released. This free mode state shown in FIG. 6 is maintained due to the elastic force of the return spring 37 described above.

The operational mode of the vehicle 1A is changed over between a fixed transmission ratio mode and a continuously variable transmission ratio mode by the operational mode of the clutch 12 being changed over between the locked mode and the free mode. During the fixed transmission ratio mode, the clutch 12 is controlled to be in the locked mode, and moreover the first motor-generator 7 is controlled to be in its shut-down state in which its functioning as an electric motor and as a generator is stopped and it can free wheel. On the other hand, during the continuously variable transmission ratio mode, the clutch 12 is controlled to be in the free mode, and moreover the motor torque and the motor rotational speed of the first motor-generator 7 are controlled so that the internal combustion engine 2 is operated at a high-efficient operating point.

Figure 7:
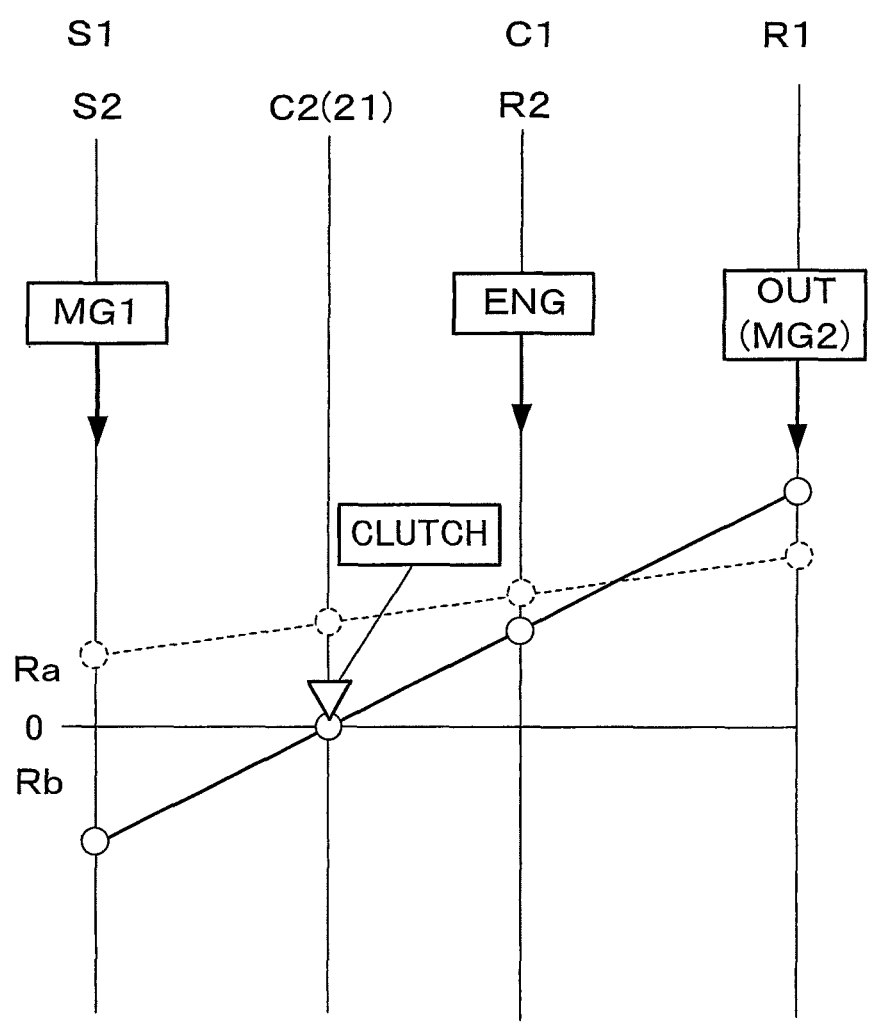
FIG. 7 is a figure showing a velocity diagram for a power split mechanism according to the first embodiment.

As shown by the solid line in FIG. 7, when the clutch 12 is in the locked mode, since the rotational plate 21 that receives the reaction torque of the internal combustion engine is prevented from rotating in the positive rotational direction Ra, accordingly, provided that engine torque is being outputted from the internal combustion engine 2 in the positive direction, the rotational speed becomes zero in the state in which this torque in the positive rotational direction Ra is acting upon the rotational plate 21. Due to this, as is clear from FIG. 7, the transmission ratio of the output portion 11 with respect to the rotational speed of the internal combustion engine 2 is uniquely determined by the gear ratio of the power split mechanism 5, so that this transmission ratio is in a fixed state. On the other hand, as shown by the broken line in FIG. 7, when the clutch 12 is in the free mode, since the rotational plate 21 is released, whichever the direction of rotation of the rotational plate 21 may be, either the positive rotational direction Ra or the negative rotational direction Rb, accordingly, by controlling the motor torque and the motor rotational speed of the motor-generator 7, it is possible to change the transmission ratio of the output portion 11 with respect to the rotational speed of the internal combustion engine 2 in a continuously variable manner.

As shown in FIG. 1, changeover of the operational mode of the vehicle 1A is implemented via control of the clutch 12 by an electronic control device (i.e. an ECU) 50 that includes a computer that controls various sections of the vehicle 1A. The output signals of sensors of various types that are employed for controlling the vehicle 1A are inputted to this ECU 50. For example, the output signals from a crank angle sensor 51 that outputs a signal corresponding to the crank angle of the internal combustion engine 2, from a vehicle speed sensor 52 that outputs a signal corresponding to the speed of the vehicle 1A, from an accelerator opening amount sensor 53 that outputs a signal corresponding to the amount by which an accelerator pedal not shown in the figures is stepped upon, and so on may be inputted to the ECU 50.

The ECU 50 calculates the power currently being demanded for the vehicle 1A by referring to the output signals of the vehicle speed sensor 52 and of the accelerator opening amount sensor 53, and controls the vehicle 1A while changing over its operational mode appropriately for this currently demanded power. For example, in the low speed region in which the thermal efficiency of the internal combustion engine 2 is poor, the ECU 50 may change over to an electric vehicle mode in which the operation of the internal combustion engine 2 is stopped and the first motor-generator 7 and/or the second motor-generator 8 are employed as sources of power for propulsion. Moreover, in conditions in which the thermal efficiency would decrease if the demanded power were to be supplied only by engine power, or the like, the ECU 50 may change over to a hybrid mode in which the internal combustion engine 2 and the second motor-generator 8 are both employed as sources of power for propulsion.

During the hybrid mode, which of the fixed transmission ratio mode and the continuously variable transmission ratio mode is selected is set in advance according to various conditions, such as the traveling state of the vehicle 1A, the operational state of the internal combustion engine 2, the temperature of the first motor-generator 7, the remaining charge amount rate of a battery not shown in the figures, and so on. For example, during implementation of the fixed transmission ratio mode, the ECU 50 may decide to change over to the continuously variable transmission ratio mode rather than continuing the fixed transmission ratio mode when some predetermined condition is satisfied such as that improvement of the system efficiency of the vehicle 1A may be anticipated or the like, and then the ECU 50 changes the clutch 12 over from the free mode to the locked mode. Due to this, the operational mode of the vehicle 1A is changed over from the fixed transmission ratio mode to the continuously variable transmission ratio mode.

As described above, when the clutch 12 is in the locked mode, the reaction torque of the engine is received and borne by the rotational plate 21. Since, in the state in which the combustion of the internal combustion engine 2 is stable, the torque of the engine continues to be outputted in the positive direction, accordingly, during the locked mode, in the state in which the rotation of the rotational plate 21 in the positive rotational direction Ra is prevented, the state in which torque acts in the positive direction continues. As will be clear from FIG. 5, the positive rotational direction Ra is the direction of rotation in which the engagement of the pawl member 26 of the clutch 12 to the recess 30 of the rotational plate 21 is stronger. Accordingly, in the state in which the combustion of the internal combustion engine 2 is stable, the engagement of the pawl member 26 of the clutch 12 to the recess 30 is maintained.

However when, during the locked mode, the internal combustion engine 2 suffers a combustion anomaly, such as for example misfiring of the internal combustion engine 2, and this anomaly is accompanied by a reduction in the engine torque, then the engine rotational speed decreases. Due to this, the torque on the rotational plate 21 whose rotation in the positive rotational direction Ra is prevented may be eliminated, and the rotational plate 21 may rotate in the negative rotational direction Rb, which is undesirable. In particular, since during the locked mode the first motor-generator 7 is controlled to be in the shut-down state, accordingly, if misfiring of the internal combustion engine 2 occurs, the torque upon the rotational plate 21 of the clutch 12 can easily be cancelled. As will be clear from FIG. 5, since the negative rotational direction Rb is the direction in which the engagement between the pawl member 26 of the clutch 12 and the recess 30 of the rotational plate 21 is broken, accordingly the engagement between the pawl member 26 of the clutch 12 and the recess 30 is temporarily released. Thereafter, when the combustion of the internal combustion engine 2 returns to normal, due to the engine rotational speed returning back up after having temporarily dropped, the rotational speed of the rotational plate 2 which is rotating in the negative rotational direction Rb approaches to and reaches zero, and the clutch 12 re-engages. Deterioration of components in the clutch 12 may be caused by this re-engagement. Moreover, in a situation in which the engine torque upon return to normal is great, sometimes it may happen that the pawl member 26 cannot properly engage into any one of the recesses 30, so that ratcheting takes place in which the rotational plate 21 rotates in the positive rotational direction Ra, although such positive rotation ought not to be permitted and up to now has not been permitted. Since strong frictional forces are generated between the pawl member 26 and the rotational plate 21 during such ratcheting, accordingly wear upon these portions occurs, and moreover a strange noise may be generated between the pawl member 26 and the rotational plate 21 along with their contact and so on.

The ECU 50 detects the occurrence of misfiring, which is one example of a combustion anomaly of the internal combustion engine 2, and if the occurrence of misfiring has been detected, then the ECU 50 keeps the clutch 12 in the free mode, irrespective of whether or not the predetermined condition for changing over the clutch 12 from the free mode to the locked mode is satisfied.

Figure 8:
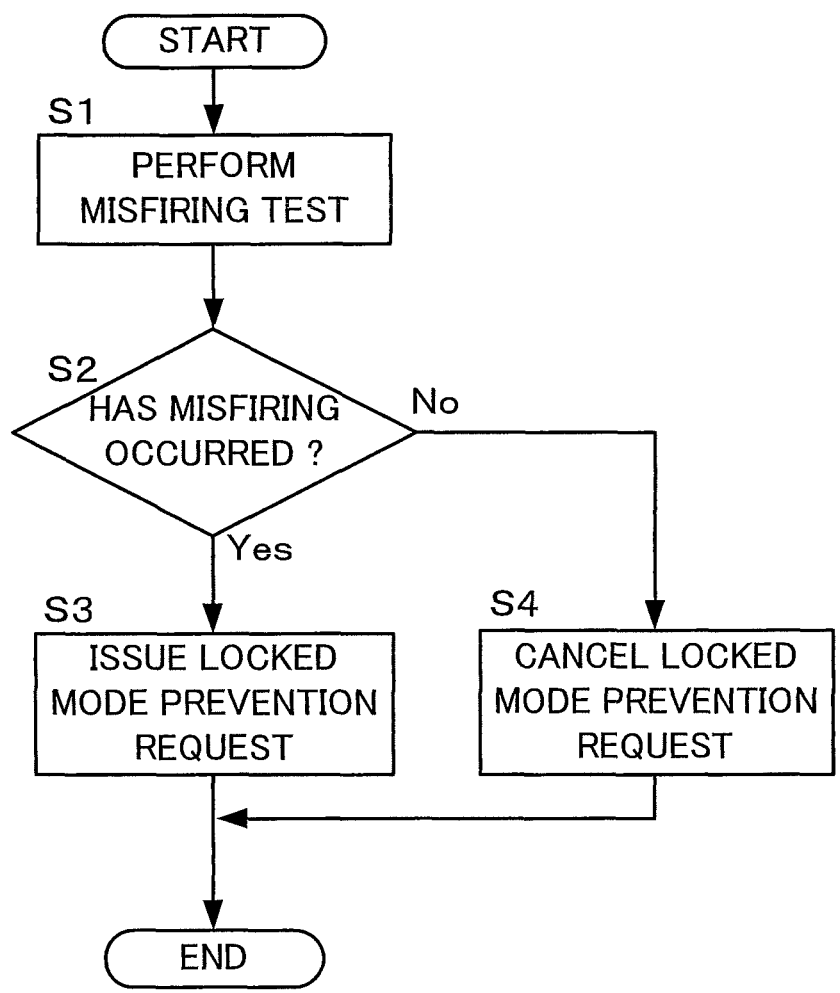
FIG. 8 is a flow chart showing an example of a control routine according to the first embodiment.

The ECU 50 implements the control described above by, for example, executing the control routine of FIG. 8. A program for the control routine of FIG. 8 is stored in the ECU 50, and is read out in a timely manner and is repeatedly executed at predetermined intervals. First in a step S1 the ECU 50 performs a misfiring test, and tests whether or not misfiring of the internal combustion engine 2 is occurring. In this misfiring test, the ECU 50 monitors the engine rotational speed by referring to the output signal of the crank angle sensor 51, and determines that misfiring of the engine has occurred if the engine rotational speed has decreased by more than a predetermined threshold value. Then in a step S2 the ECU 50 determines whether or not misfiring of the internal combustion engine 2 has occurred based upon the result of the misfiring test in the step S1, and transfers the flow of control to a step S3 if such misfiring has occurred. But if misfiring has not occurred, then the flow of control is transferred to a step S4.

In the step S3, the ECU 50 issues a locked mode prevention request for preventing changeover of the clutch 12 to the locked mode. When this locked mode prevention request is issued, if the current operational mode of the clutch 12 is the free mode, then changing over from the free mode to the locked mode is prevented until the locked mode prevention request is cancelled, even if the predetermined condition described above that has been provided in order to change over to the locked mode is satisfied. Moreover, if the state of the operational mode of the clutch 12 at the time point that the locked mode prevention request is issued is the locked mode, then changeover is performed from the locked mode to the free mode. Accordingly, irrespective of whether or not the predetermined condition described above is satisfied, the clutch is kept in the free mode from when the locked mode prevention request is issued until the locked mode prevention request is cancelled.

In the step S4, the ECU 50 cancels the locked mode prevention request. In this manner, when the control routine of FIG. 8 has issued a locked mode prevention request in the step S3, at the time point that the occurrence of misfiring ceases to be detected, this locked mode prevention request is immediately cancelled in the step S4. However, since misfiring is considered to be occurring even if it is not occurring continuously but has occurred even just once, accordingly it would also be possible not to cancel the issuance of the locked mode prevention request during a predetermined time period from when it has been issued, but only to cancel this issuance at the time point that the occurrence of misfiring has still not been detected again after this predetermined time period has elapsed. Moreover, in order to avoid the issuance and cancellation of locked mode prevented requests being repeated at short intervals and thus causing over-busy operation of the clutch 12, it would also be possible, if such issuance and cancellation have been repeated a predetermined number of times, to defer cancellation of a locked mode prevention request until the current trip of the vehicle 1A has ended.

According to this first embodiment, since the free mode is maintained when misfiring of the internal combustion engine 2 has occurred, accordingly it is possible to avoid component deterioration due to re-engagement of the clutch 12 that might otherwise take place if misfiring occurs during the locked mode, and it is also possible to avoid wear and/or strange noises that might be caused due to the occurrence of ratcheting.

The control routine of FIG. 8 detects misfiring of the internal combustion engine 2 via the misfiring test described above, and issues a locked mode prevention request if misfiring has been detected. However it would also be possible to detect, not misfiring itself, but a device anomaly that accompanies misfiring, and to issue a locked mode prevention request when such a device anomaly has been detected, in a similar manner to the action performed by the control routine of FIG. 8. As such a type of device anomaly it may be possible to detect, for example, an anomaly of an engine component that is correlated with the combustion of the internal combustion engine 2, such as a fuel injector or a spark plug (neither of which is shown in the figures) or the like, or an anomaly of a sensor of a type that is used for controlling the internal combustion engine 2 such as an A/F sensor or an air flow meter (neither of which is shown in the figures) or the like, and it would be possible to issue a locked mode prevention request, in a similar manner to the action performed by the control routine of FIG. 8, if such an anomaly of an engine component or of a sensor has been detected. An already per se known method of detection may be employed for the detection of such an anomaly of an engine component or sensor.

Embodiment #2

Figure 9:
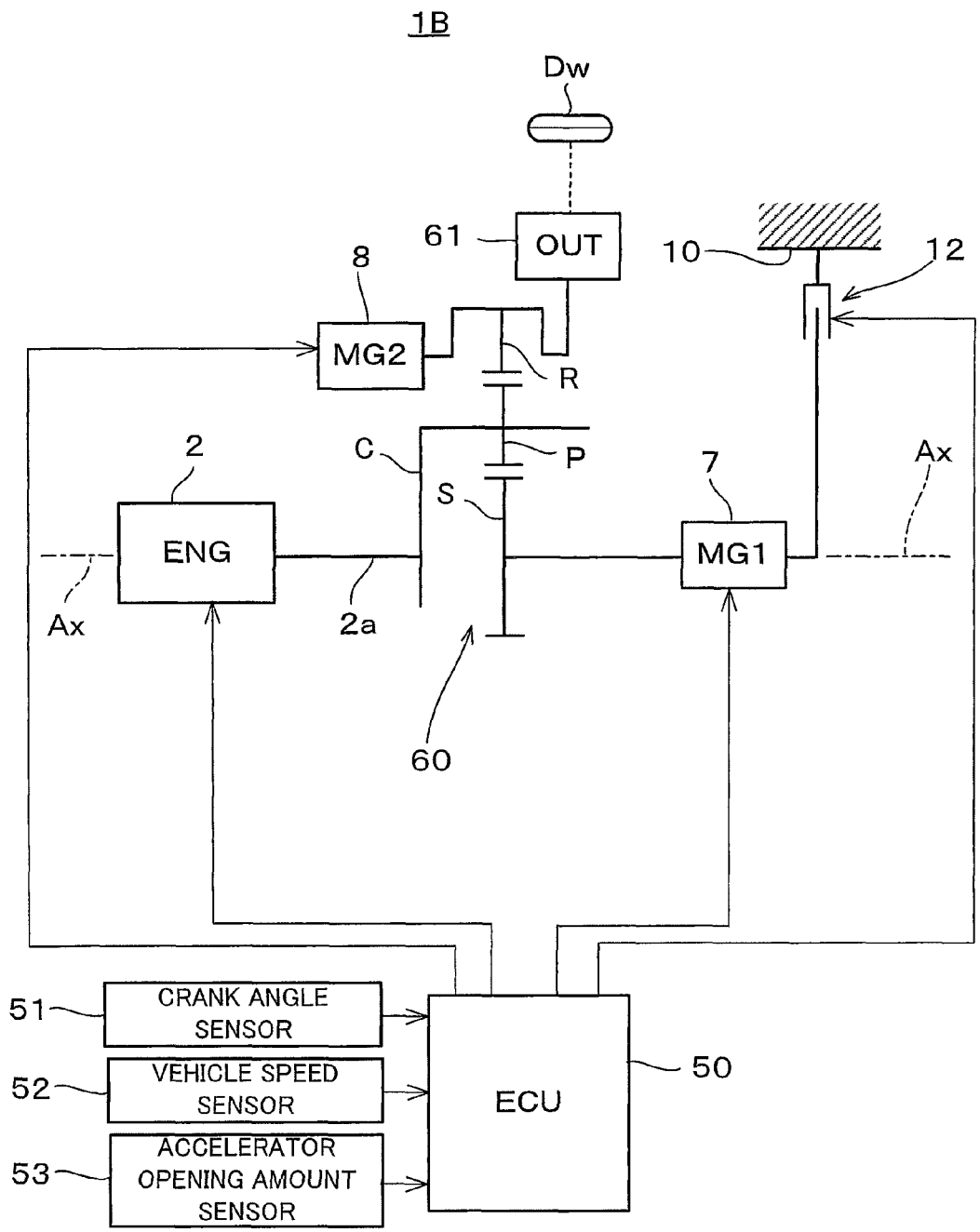
FIG. 9 is a schematic figure showing the structure of a hybrid vehicle to which a hybrid drive device according to a second embodiment of the present invention has been applied.

Next, a second embodiment of the present invention will be explained with reference to FIGS. 9 and 10. The structure of a hybrid vehicle 1B to which a hybrid drive device according to this second embodiment has been applied is schematically shown in FIG. 9. This vehicle 1B differs from the vehicle 1A of the first embodiment in that it has a different structure for the power split mechanism 60, a different structure from the power split mechanism 60 to the drive wheels Dw, and a different location for mounting of the clutch 12. Since the other structural elements of this vehicle 1B are the same as corresponding ones of the vehicle 1A, accordingly the structures which are common to this vehicle 1B and the vehicle 1A will be denoted in FIG. 9 by the same reference symbols, and explanation thereof will be curtailed.

The power split mechanism 60 is built as a single pinion type planetary gear mechanism, and comprises a sun gear S which is an externally toothed gear wheel, a ring gear R which is an internally toothed gear wheel, and a carrier C which itself rotates and which also rotatably carries a pinion P that is meshed with these gears S and R. The sun gear S, the ring gear R, and the carrier C function as three rotating elements that rotate differentially with respect to one another. A first motor-generator 7 and a rotational plate 21 of a clutch 12 that will be described hereinafter are joined to the sun gear S, an internal combustion engine 2 is joined to the carrier C, and an output portion 61 that includes a gear train and so on not shown in the figures for outputting torque to drive wheels Dw is joined to the ring gear R. In this second embodiment, the sun gear S corresponds to the "first rotating element" of the Claims, the carrier C corresponds to the "second rotating element" of the Claims, and the ring gear R corresponds to the "third rotating element" of the Claims. As will be clear from the velocity diagram of FIG. 10, when these three rotating elements are laid out upon this velocity diagram, they appear in the order: the sun gear S which corresponds to the first rotating element; the carrier C which corresponds to the second rotating element; and the ring gear R which corresponds to the third rotating element.

In the case of this second embodiment, the clutch 12 that is provided to the vehicle 1B functions as a brake that is interposed between the sun gear S and the casing 10, with a rotational plate 21 of the clutch 12 being provided to the sun gear S. In a similar manner to the case in the first embodiment, the operational mode of this clutch 12 can be selected between: a locked mode in which, when the direction of rotation of the sun gear S is the positive rotational direction Ra, the clutch 12 permits torque transmission from the sun gear S to the casing 10 so that the sun gear S is in a fixed state, whereas, when the direction of rotation is the negative rotational direction Rb, this transmission of torque is separated and the sun gear S is changed over to a released state; and a free mode in which, whichever be the direction of rotation of the sun gear S, either the positive rotational direction Ra or the negative rotational direction Rb, torque transmission from the sun gear S to the casing 10 is separated and the sun gear is kept in the released state.

In this vehicle 1B, an operational mode is changed over between a motor locked mode and a motor free mode by the operational mode of the clutch 12 being changed over between the locked mode and the free mode. The changeover between these two operational modes is implemented by the ECU 50 in a similar manner to the way in which this is performed in the first embodiment. During the motor locked mode, the clutch 12 is controlled to be in the locked mode, and moreover the function of the first motor-generator 7 as an electric motor and as a generator is stopped and the first motor-generator 7 is controlled to be in the shut-down state in which it can free wheel. Due to this, along with it being possible to avoid overheating of the first motor-generator 7 and so on, also it becomes possible to avoid power recirculation, which would reduce the system efficiency. On the other hand, during the motor free mode, the clutch 12 is controlled to be in the free mode, and moreover the motor torque and the motor rotational speed of the first motor-generator 7 are controlled so that the internal combustion engine 2 operates at a high efficiency operating point.

Figure 10:
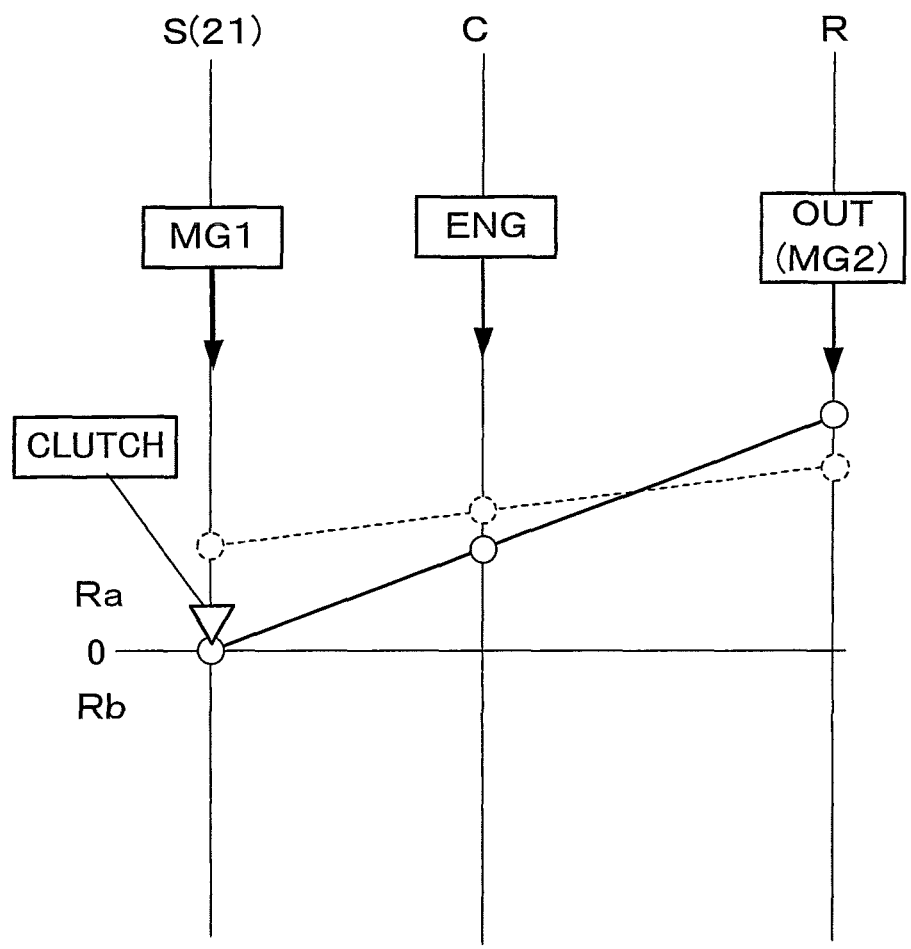
FIG. 10 is a figure showing a velocity diagram for a power split mechanism according to this second embodiment.

As shown by the solid line in FIG. 10, since rotation in the positive rotational direction Ra of the rotational plate 21 which receives the reaction torque of the internal combustion engine 2 is prohibited when the clutch 12 is in the locked mode, accordingly, unless engine torque is being outputted in the positive direction from the internal combustion engine 2, the rotational speed in the state in which torque acts in the positive rotational direction Ra upon the rotational plate 21 becomes zero. Due to this, the transmission ratio of the output portion 61 with respect to the engine rotational speed comes to be uniquely determined by the gear ratio of the power split mechanism 60, and this transmission ratio comes to be in a fixed state. On the other hand, as shown by the broken line in FIG. 10, when the clutch 12 is in the free mode, since the rotational plate 21 is released whichever be its direction of rotation, either the positive rotational direction Ra or the negative rotational direction Rb, accordingly it is possible to vary the transmission ratio of the output portion 61 with respect to the rotational speed of the engine in a continuously variable manner by controlling the motor torque and the motor rotational speed of the first motor-generator 7.

In this second embodiment as well, since a similar problem to that encountered in the case of the first embodiment arises if a combustion anomaly of the internal combustion engine 2, for example misfiring, occurs during the motor locked mode, accordingly the ECU 50 maintains the free mode of the clutch 12, irrespective of whether or not the predetermined condition for changing over the clutch 12 from its release mode to the locked mode is satisfied. In this second embodiment, the control routine that is implemented by the ECU 50 is the same as the control routine of FIG. 8 for the first embodiment. Moreover, in a similar manner to the case of the first embodiment, it would also be possible not to detect misfiring itself, but to detect some device anomaly associated with misfiring, and to issue a locked mode prevention request when this device anomaly has been detected. And the cancellation of the locked mode prevention request may be changed as explained in connection with the first embodiment.

Since, according to this second embodiment, the clutch 12 is kept in the free mode if misfiring of the internal combustion engine has occurred, in a similar manner to the case with the first embodiment, accordingly it is possible to avoid component deterioration due to re-engagement of the clutch 12 that might otherwise take place if misfiring occurs during the locked mode, and it is also possible to avoid wear and/or strange noises due to the occurrence of ratcheting.

The present invention is not limited to the embodiments described above; it may be implemented in various different ways within the range of its scope. While, in the embodiments described above, misfiring was shown as an example of a combustion anomaly that is accompanied by reduction of the engine torque, it would also be acceptable to arrange for the subject of the present invention to be a combustion anomaly of any type that is accompanied by a reduction of the engine torque. For example, it would also be possible to issue a locked mode prevention request and to keep the clutch 12 in the free mode if a combustion anomaly such as pre-ignition or knocking or the like has occurred, or if a device anomaly that accompanies such a combustion anomaly has occurred. As a device anomaly that accompanies pre-ignition, there may be cited an anomaly of some engine component such as a spark plug or the like, as in the case of a device anomaly that accompanies misfiring. Moreover, as a device anomaly that accompanies knocking, there may be cited an anomaly signaled by a sensor of some type such as a knock sensor (not shown in the figures) or the like. It would also be possible for the subject of application of the present invention to be, not only when one of these various types of anomaly has occurred by itself, but also when several of these various types of anomaly have occurred in combination.

Yet further, while the internal combustion engine 2 to which the various embodiments described above was a spark ignition type engine, it would also be possible to implement a hybrid drive device according to the present invention in a form to which a diesel engine having no spark plug is provided. Premature ignition in which the ignition timing is too much advanced and diesel knocking are per se known as combustion anomalies that are specific to diesel engines. Accordingly, in the case of an embodiment to which a diesel engine is provided, it would be possible to issue a locked mode prevention request and to maintain the free mode of the one-way clutch if premature ignition or diesel knocking has occurred, or if a device anomaly that is accompanied by such a combustion anomaly has occurred. Moreover, since sometimes misfiring can occur with a diesel engine as well, it would also be possible to take the case when this type of misfiring occurs, or when an anomaly associated with such misfiring occurs, as a subject for application of the present invention.

The invention claimed is:

1. A hybrid drive device, comprising:
an engine;
a motor-generator;
an output portion that outputs torque to a drive wheel;
a differential mechanism having a plurality of rotating elements that are differentially rotatable with respect to one another, the engine being joined to one of the plurality of rotating elements, the motor-generator being joined to another one of the plurality of rotating elements, and the output portion being joined to yet another one of the plurality of rotating elements;
a selectable one-way clutch comprising a rotating member that can receive a reaction torque of an engine torque of the engine and that is provided to the differential mechanism, and that can be changed over between: a locked mode in which, in the state of receiving the reaction torque, positive rotation of the rotating member is prevented, while negative rotation of the rotating member in the direction opposite to the positive rotation is permitted; and a free mode in which, in the state of receiving the reaction torque, the positive rotation and the negative rotation of the rotating member are both permitted; and
a control device that changes over the selectable one-way clutch from the free mode to the locked mode when a predetermined condition is satisfied;
wherein the control device keeps the selectable one-way clutch in the free mode if a combustion anomaly that is accompanied by a reduction in the engine torque of the engine has occurred, or if a device anomaly that is associated with such a combustion anomaly has occurred.

2. The hybrid drive device according to claim 1, wherein, when the selectable one-way clutch is in the locked mode, the control device controls the motor-generator to stop its functions as an electric motor and as a generator so that it is in a shut-down state in which it is capable of free-wheeling.

3. The hybrid drive device according to claim 1, wherein, as the plurality of rotating elements, the differential mechanism is provided with four rotating elements, with the motor-generator being joined to a first rotating element of the four rotating elements, the rotating member of the selectable one-way clutch being joined to a second rotating element of the four rotating elements, the engine being joined to a third rotating element of the four rotating elements, and the output portion being joined to a fourth rotating element of the four rotating elements; and, when the four rotating elements are laid out upon a velocity diagram, the first rotating element, the second rotating element, the third rotating element, and the fourth rotating element appear in that order.

4. The hybrid drive device according to claim 1, wherein, as the plurality of rotating elements, the differential mechanism is provided with three rotating elements, with the motor-generator and the rotating member of the selectable one-way clutch being joined to a first rotating element of the three rotating elements, the engine being joined to a second rotating element of the three rotating elements, and the output portion being joined to a third rotating element of the three rotating elements; and, when the three rotating elements are laid out upon a velocity diagram, the first rotating element, the second rotating element, and the third rotating element appear in that order.

* * * * *